US012778173B2

(12) United States Patent
Kang et al.

(10) Patent No.: US 12,778,173 B2
(45) Date of Patent: Nov. 3, 2026

(54) MEAT SUBSTITUTE AND DUMPLINGS

(71) Applicant: CJ CHEILJEDANG CORPORATION, Seoul (KR)

(72) Inventors: Bokyeong Kang, Seoul (KR); Saemi Park, Seoul (KR); Jiyeon Kim, Seoul (KR); Sun Young Park, Seoul (KR); Gun Ae Cho, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 187 days.

(21) Appl. No.: 18/577,958

(22) PCT Filed: Jul. 12, 2022

(86) PCT No.: PCT/KR2022/010140
§ 371 (c)(1),
(2) Date: Jan. 9, 2024

(87) PCT Pub. No.: WO2023/287170
PCT Pub. Date: Jan. 19, 2023

(65) Prior Publication Data

US 2024/0315300 A1 Sep. 26, 2024

(30) Foreign Application Priority Data

Jul. 12, 2021 (KR) ........................ 10-2021-0091257

(51) Int. Cl.

| | |
|---|---|
| ***A23L 29/262*** | (2016.01) |
| ***A23J 3/16*** | (2006.01) |
| ***A23J 3/22*** | (2006.01) |
| ***A23L 33/22*** | (2016.01) |
| ***A23P 20/20*** | (2016.01) |

(52) U.S. Cl.
CPC ............... *A23L 29/262* (2016.08); *A23J 3/16* (2013.01); *A23J 3/227* (2013.01); *A23L 33/22* (2016.08); *A23P 20/20* (2016.08)

(58) Field of Classification Search
CPC ........ A23L 29/262; A23L 33/22; A23P 20/20; A23J 3/227
See application file for complete search history.

(56) References Cited

U.S. PATENT DOCUMENTS

| | | | | |
|---|---|---|---|---|
| 4,235,935 A * | 11/1980 | Bone | ........................ | A23J 3/227 426/802 |
| 2019/0037893 A1 | 2/2019 | Ajami et al. | | |

FOREIGN PATENT DOCUMENTS

| | | | |
|---|---|---|---|
| CA | 3 144 313 | A1 | 3/2021 |
| CN | 111657423 | A | 9/2020 |
| JP | 2000-342195 | A | 12/2000 |
| KR | 10-2020-0048097 | A | 5/2020 |
| KR | 10-2020-0141958 | A | 12/2020 |
| KR | 10-2021-0030631 | A | 3/2021 |
| KR | 10-2021-0048025 | A | 5/2021 |

OTHER PUBLICATIONS

East Meets Kitchen, Vegan dim sum: "pork" and cabbage dumplings'. Available online as of Nov. 15, 2016. Pages 1-3. (Year: 2016).*
Sennebogen, "What is textured vegetable protein and is it good for you?". Available online as of Apr. 9, 2019 from https://recipes.howstuffworks.com. pp. 1-4. (Year: 2019).*
Notice of Allowance issued Feb. 6, 2024 for Korean Patent Application No. 10-2022-0085912.
Database GNPD [Online] Mintel, "Chilli Burger", Database accession No. 8563729, Mar. 2021, pp. 1-3, XP093201314.
Database GNPD [Online] Mintel, "Vegan Mince", Database accession No. 8636937, Apr. 2021, pp. 1-2, XP093201323.
Anastasia, "Vegan Pelmeni (Russian Seitan Dumplings", Slavic Vegan, Jan. 9, 2019, pp. 1-17, XP093202057.
Extended European Search Report issued in corresponding European Patent Application No. 22842431.1, dated Sep. 17, 2024.
International Search Report issued in corresponding International Patent Application No. PCT/KR2022/010140 dated Oct. 24, 2022.
Kim et al., "Quality of Soy-Based Patties Using K-Carrageenan and Methyl-Cellulose as Binders During Cold Storage Periods", Food Eng. Prog., vol. 24, No. 4, Nov. 2020, pp. 317-326.
Kim et al., "Effects of Wheat Fiber and Isolated Soy Protein on the Quality Characteristics of Frankfurter-type Sausages", Korean J. Food Sci. Ani. Resour., vol. 29, No. 4, 2009, pp. 475-481.
Lee at al., "Current Status and Development Strategies of Domestic Plant-based Meat Alternative Food Market", Department of Food Science and Biotechnology, Sejong University, May 2021, pp. 61-70 (10 pages).

* cited by examiner

*Primary Examiner* — Jenna A Watts
(74) *Attorney, Agent, or Firm* — Morgan, Lewis & Bockius LLP

(57) ABSTRACT

The present disclosure provides a binding food including cellulose ether and insoluble dietary fiber.

23 Claims, No Drawings

MEAT SUBSTITUTE AND DUMPLINGS

BACKGROUND OF THE INVENTION

1. Field of the Invention

The present disclosure relates to a food binding material including no animal-based ingredients, which is able to replace meat products, and dumplings prepared using the same.

2. Description of the Related Art

Meats are the main sources of proteins for humans, and people have consumed meats or foods prepared using meats for a long time. However, with the diverse views on health, environment, animal welfare, etc. around the world and the changing social perception, more and more people are intentionally limiting their intake of foods containing animal-based ingredients and consuming foods containing only vegetable-based ingredients instead. There are a variety of motivations for this trend, including reasons based on ethical beliefs to value animal life and protect animal rights, religious reasons as in Buddhism and Hinduism where the consumption of animal-based ingredients is prohibited, health reasons considering nutritional issues such as high contents of cholesterol and fat components in meats, constitutional reasons such as allergies, etc.

As the reasons and motivations for being a vegetarian and restricting the consumption of animal-based ingredients are diverse, the demand for food materials and foods capable of replacing the existing meat diets is steadily increasing. Accordingly, studies on materials to replace meat products have been continued. To replace meat products, it is essential that the substitute food have a high protein content from the nutritional aspect, and soy meats, which are prepared using the proteins isolated from soybeans that are known to contain a high protein content among vegetable-based raw materials, are being used as a representative meat substitute.

However, the materials to replace meat products should have characteristics similar to real meats in terms of physical properties, taste, and mouthfeel as well as protein content. The meat-like mouthfeel can be achieved only when the vegetable-based raw materials can bind together to exhibit the firm meat-like texture thereby exhibiting appropriate hardness, chewiness, springiness, etc. when chewed. In an attempt to realize the meat-like mouthfeel using vegetable-based raw materials, Korean Patent Application Publication No. 2020-0048097 has achieved a characteristic similar to the juicy meat texture by producing vegetable meats using vegetable fats. In Korean Patent Application Publication No. 2020-0141958, the mouthfeel of artificial meat has been improved by using gluten, starch, protein crosslinking agents, protein hydrolyzates, etc. However, despite these previous studies, it has still been difficult to achieve physical properties, such as mouthfeel and binding property, enough to completely replace meats. In addition, since the existing meat substitutes include isolated soy protein (ISP) as an essential component, which has a high production cost, there are still high demand and need for the development of meat substitutes including no ISP in view of the production cost, the efficiency of the production process, etc. while having excellent mouthfeel and meat-like physical properties.

SUMMARY OF THE INVENTION

An object of the present disclosure is to provide a binding food which includes cellulose ether and insoluble dietary fiber, and has an adhesiveness of 300 g·sec to 700 g·sec.

Another object of the present disclosure is to provide a method of preparing the binding food, wherein the method comprises mixing a composition including cellulose ether and insoluble dietary fiber at a rate of 2,000 rpm to 4,000 rpm.

Still another object of the present disclosure is to provide a dumpling stuffing including the binding food.

Still another object of the present disclosure is to provide a dumpling including the dumpling stuffing.

DETAILED DESCRIPTION OF THE PREFERRED EMBODIMENTS

The present disclosure will be described in detail as follows. Meanwhile, each description and embodiment disclosed in this disclosure may also be applied to other descriptions and embodiments. That is, all combinations of various elements disclosed in this disclosure fall within the scope of the present disclosure. Further, the scope of the present disclosure is not limited by the specific description described below. Further, a number of papers and patent documents are referenced and cited throughout this specification. The disclosures of the cited papers and patent documents are incorporated herein by reference in their entirety to further clarify the level and scope of the subject matter to which the present invention pertains.

One aspect of the present disclosure provides a binding food including cellulose ether and insoluble dietary fiber.

As used herein, the term "binding food" refers to a food made in a lump shape, in which segmented food materials bind together, and may be understood as having the same meaning as a "binding product" or "kneading composition" in the present disclosure. The binding food of the present disclosure may be used as a meat substitute because it retains meat-like physical properties and mouthfeel even without including meats.

As used herein, the term "material for a meat substitute" may refer to a material to replace meat products, the material exhibiting physical properties similar to foods prepared using meats, even though it does not include animal-based ingredients. The meat substitute may be used with the same meaning as the terms "meat alternative", "artificial meat", "fake meat", "imitation meat", "soy meat", "vegetable meat", "plant meat", etc. The meat product may include any one without limitation as long as it is a product including meats, for example, a food material or a food which is prepared from lean meats, muscles, fats, or mixtures thereof, which are separated from pigs, cattle, horses, sheep, goats, deer, poultry (chicken, ducks, geese, turkey, ostriches, turkey, pheasant), etc.

As used herein, the term "cellulose ether" refers to a cellulose derivative obtained by etherification of hydroxyl groups of cellulose. Specifically, the cellulose ether may be methyl cellulose or hydroxypropyl methylcellulose. In the binding food of the present disclosure, through the combination of cellulose ether and insoluble dietary fiber, a firm texture can be realized by cellulose ether and the insoluble dietary fiber can relieve the strong cohesiveness of cellulose ether, thereby forming an appropriate texture through complementary effects therebetween. Therefore, the binding food of the present disclosure may be suitable to be used as a meat substitute because the two materials complement each other to exhibit physical properties at a level similar to those containing animal-based materials.

As used herein, the term "methyl cellulose" refers to a methyl derivative of cellulose prepared by reacting alkali cellulose with halogenated methyl (CHX). The methyl cellulose is used in various industrial fields such as thickeners, bakery products, sifting-improving agents, coating and packaging, textile industry, agriculture, pharmaceuticals, etc.

As used herein, the term "hydroxypropyl methylcellulose" refers to propylene glycol ether of methylcellulose, and is used as a food emulsifier, stabilizer, thickener, dispersant, etc.

Specifically, the cellulose ether may be included in an amount of 1 wt % to 5 wt % based on the total weight of the binding food. More specifically, the cellulose ether may be included in the food in an amount of the range consisting of any one lower limit selected from 1 wt %, 1.1 wt %, 1.2 wt %, 1.3 wt %, 1.4 wt %. 1.5 wt %, 1.6 wt %, 1.7 wt %, 1.8 wt %, 1.9 wt %, 2 wt %, 2.1 wt %, 2.2 wt %, 2.3 wt %, 2.4 wt %, 2.5 wt %, 2.6 wt %, 2.7 wt %, 2.8 wt %, 2.9 wt %, and 3 wt %, and/or any one upper limit selected from 5 wt %, 4.9 wt %, 4.8 wt %, 4.7 wt %, 4.6 wt %, 4.5 wt %, 4.4 wt %, 4.3 wt %, 4.2 wt %, 4.1 wt %, 4 wt %, 3.9 wt %, 3.8 wt %, 3.7 wt %, 3.6 wt %, 3.5 wt %. 3.4 wt %, 3.3 wt %. 3.2 wt %, 3.1 wt %, and 3 wt %. For example, the cellulose ether may be included in an amount of 1 wt % to 5 wt %, 1.2 wt % to 4.8 wt %, 1.5 wt % to 4.5 wt %, 1.7 wt % to 4.3 wt %, 2 wt % to 4 wt %, 2.2 wt % to 3.8 wt %, 2.5 wt % to 3.5 wt %, 2.7 wt % to 3.3 wt %, 3 wt % to 3.5 wt %, or 2.5 wt % to 3 wt %. When the cellulose ether is included in an amount of the above range, it prevents oil and moisture from escaping, and facilitates gelation and formation of texture when the binding food is heated.

As used herein, the term "insoluble dietary fiber" refers to insoluble polysaccharides that are not digested by digestive enzymes. The insoluble dietary fiber may include one or more selected from the group consisting of cellulose, hemicellulose, lignin, and chitin, but is not limited thereto.

Specifically, the insoluble dietary fiber may include any one isolated from any plant, for example, wheat dietary fiber or bamboo dietary fiber.

Specifically, the insoluble dietary fiber may be included in an amount of 1 wt % to 10 wt % based on the total weight of the binding food. More specifically, the insoluble dietary fiber may be included in the binding food in an amount of the range consisting of any one lower limit selected from 1 wt %, 1.5 wt %, 2 wt %, 2.5 wt %. 3 wt %, 3.5 wt %, and 4 wt %, and/or any one upper limit, which is selected to be higher than the lower limit from 10 wt %, 9.5 wt %, 9 wt %, 8.5 wt %, 8 wt %, 7.5 wt %. 7 wt %, 6.5 wt %, 6 wt %, 5.5 wt %, 5 wt %, 4.5 wt %, 4 wt %, 3.5 wt %, and 3 wt %. For example, the insoluble dietary fiber may be included in an amount of 1 wt % to 10 wt %, 1 wt % to 7 wt %, 1 wt % to 6 wt %, 1 wt % to 5 wt %, and 2 wt % to 5 wt %. When the insoluble dietary fiber is included in an amount of the above range in the binding food of the present disclosure, it may relieve cohesiveness of the cellulose ether to realize an appropriate texture, thereby exhibiting physical properties at a level similar to those of materials containing animal-based ingredients.

Specifically, the binding food may include cellulose ether and insoluble dietary fiber at a ratio of 0.3 to 2:1. Due to the ratio of cellulose ether and insoluble dietary fiber, the binding food of the present disclosure, as it is, may have meat-like adhesiveness even before adding protein components, and when the ratio of cellulose ether is higher or lower than the above range, the meat-like texture may not be realized. For example, the binding food may include cellulose ether and insoluble dietary fiber at a ratio of 0.3 to 1.7:1. For another example, the binding food may include cellulose ether and insoluble dietary fiber at a ratio of 0.5 to 2:1. For still another example, the binding food may include cellulose ether and insoluble dietary fiber at any one ratio of 0.3 to 0.6:1, 0.3 to 1:1, 0.5 to 1.7:1, 0.5 to 1:1, 1 to 2:1, and 0.5 to 2:1.

Specifically, the sum of the cellulose ether and the insoluble dietary fiber may be included in an amount of 2 wt % to 15 wt % based on the total weight of the binding food. More specifically, the sum of the cellulose ether and the insoluble dietary fiber may be included in the binding food in an amount of the range consisting of any one lower limit selected from 1 wt %, 1.5 wt %, 2 wt %, 2.5 wt %, 3 wt %, 3.5 wt % and 4 wt %, 4.5 wt %, 5 wt %, 5.5 wt %, and 6 wt %, and/or any one upper limit, which is selected to be higher than the lower limit from 15 wt %, 14.5 wt %, 14 wt %, 13.5 wt %, 13 wt %, 12.5 wt %, 12 wt %, 11.5 wt %, 11 wt %, 10.5 wt %, 10 wt %, 9.5 wt %, 9 wt %, 8.5 wt %, 8 wt %, 7.5 wt %, 7 wt %, 6.5 wt %, 6 wt %, 5.5 wt %, and 5 wt %. For example, the sum of the cellulose ether and the insoluble dietary fiber may be included in an amount of 5 wt % to 10 wt % based on the total weight of the binding food. When the sum of the cellulose ether and the insoluble dietary fiber is lower than the above range of wt %, meat-like physical properties and mouthfeel may not be properly achieved, and when it is higher than the above range, the surface stickiness of the meat substitute may excessively increase.

The binding food of the present disclosure may not include animal-based ingredients. The binding food may not include lean meats, muscles, fats, or mixtures thereof, which are separated from pigs, cattle, horses, sheep, goats, deer, poultry (chicken, ducks, geese, turkey, ostriches, turkey, pheasant), etc.

Although the binding food of the present disclosure does not include animal-based ingredients, it has the excellent effects of exhibiting physical properties and mouthfeel similar to food materials or foods which are prepared by applying animal-based ingredients, and thus the binding food may be usefully used as a material for replacing meat products.

Furthermore, the binding food of the present disclosure, as it is, may retain meat-like physical properties and mouthfeel even without adding a protein component or even before adding a protein component. For example, the binding food of the present disclosure may not include isolated soy protein (ISP).

Specifically, the binding food of the present disclosure may retain adhesiveness equal or similar to meats without including animal dietary fibers, animal proteins, and animal fats, thereby being used as a meat substitute.

As used herein, the term "adhesiveness" refers to a unique value that measures a food material' property of sticking to a material or surface, and the term "binding property" refers to a property that respective components included in the binding food adhere to each other.

The adhesiveness of the binding food may be in the range equal or similar to that of meat. In an exemplary embodiment of the present disclosure, adhesiveness of a pork binding product prepared using pork as a raw material was measured as about 455,498 g·sec (Example 4). Therefore, as used herein, the adhesiveness in the range equal or similar to that of meat may mean adhesiveness in the range of 300 g·sec to 700 g·sec, and more specifically, in the range of 400 g·sec to 700 g·sec.

In particular, the adhesiveness may be measured using a physical properties analyzer under the following conditions.

[Measurement Conditions]

Force: 5.0 g/Distance: 40 mm/Test speed: 2.00 mm/s

Specifically, the adhesiveness of the binding food may be measured using a probe of the physical properties analyzer under the above conditions, and for example, it may be measured as a force required to remove the probe after attaching the probe to the surface of the binding food. More specifically, the adhesiveness of the binding food may be a value in the range consisting of any one lower limit selected from 300 g·sec, 320 g·sec, 350 g·sec, 370 g·sec, 400 g·sec, 420 g·sec, 450 g·sec, 470 g·sec, and 500 g·sec, and/or any one upper limit selected from 700 g·sec, 680 g·sec, 650 g·sec, 630 g·sec, 600 g·sec, 580 g·sec, 550 g·sec, 530 g·sec, and 500 g·sec. For example, the binding food may exhibit adhesiveness expressed as a value of 300 g·sec to 700 g·sec, 320 g·sec to 680 g·sec, 350 g·sec to 650 g·sec, 370 g·sec to 630 g·sec, 400 g·sec to 600 g·sec, 420 g·sec to 580 g·sec, 450 g·sec to 550 g·sec, 470 g·sec to 530 g·sec, 500 g·sec to 550 g·sec, or 450 g·sec to 500 g·sec. As described, the binding food of the present disclosure may have the meat-like adhesiveness and thus has an excellent binding property, thereby exhibiting meat-like mouthfeel, texture, or appearance.

The binding food of the present disclosure may further include an aqueous component. The aqueous component may include an aqueous component used in the art for the production of foods, and specifically, may include one or more selected from water and brewed soy sauce.

Specifically, the water may be included in an amount of 35 wt % to 70 wt %, based on the total weight of the binding food. More specifically, the water may be included in an amount of the range consisting of any one lower limit selected from 40 wt %, 40.5 wt %, 41 wt %, 41.5 wt %, 42 wt %, 42.5 wt %, 43 wt %, 43.5 wt %, 44 wt %, 44.5 wt %, 45 wt %, 45.5 wt %, 46 wt %, 46.5 wt %, 47 wt %, 47.5 wt %, 48 wt %, 48.5 wt %, 49 wt %, 49.5 wt %, and 50 wt %, and/or any one upper limit, which is selected to be higher than the lower limit from 70 wt %, 69.5 wt %, 69 wt %, 68.5 wt %, 68 wt %, 67.5 wt %, 67 wt %, 66.5 wt %, 66 wt %, 65.5 wt %, 64.5 wt %, 64 wt %, 63.5 wt %. 63 wt %, 62.5 wt %, 62 wt %61.5 wt %, 61 wt %, 60.5 wt %, and 60 wt %.

Specifically, the brewed soy sauce may be included in an amount of 5 wt % to 12 wt %, based on the total weight of the binding food. The brewed soy sauce may be included in the binding food in an amount of the range consisting of any one lower limit selected from 5 wt %, 5.5 wt %, 6 wt %, 6.5 wt %, 7 wt %, 7.5 wt %, and 8 wt %, and/or any one upper limit, which is selected to be higher than the lower limit from 10 wt %, 9.5 wt %, 9 wt %, 8.5 wt %, and 8 wt %.

The aqueous component may be included in an amount of 50 wt % to 70 wt %, based on the total weight of the binding food. In this regard, the content of the aqueous component may be understood as a value measured based on the state before cooking of the binding food. Specifically, the aqueous component may be included in the binding food in an amount of the range consisting of any one lower limit selected from 50 wt %, 50.5 wt %, 51 wt %, 51.5 wt %, 52 wt %, 52.5 wt %. 53 wt %, 53.5 wt % and 54 wt %, 54.5 wt %, 55 wt %, 55.5 wt %, 56 wt %, 56.5 wt %, 57 wt %, 57.5 wt %, 58 wt %, 58.5 wt %, 59 wt %, 59.5 wt %, and 60 wt %, and/or any one upper limit, which is selected to be higher than the lower limit from 70 wt %, 69.5 wt %, 69 wt %, 68.5 wt %, 68 wt %, 67.5 wt %, 67 wt %, 66.5 wt %, 66 wt %, 65.5 wt %, 65 wt %, 64.5 wt %, 64 wt %, 63.5 wt %, 63 wt %, 62.5 wt %, 62 wt %. 61.5 wt %, 61 wt %, 60.5 wt %, 60 wt %, 59.5 wt %, and 59 wt %. When the content of the aqueous component is lower than the above range, the binding food may not be properly achieved due to reduced cohesiveness and increased flowability, and when it is higher than the above range, stuffing is difficult due to excessively increased cohesiveness, and as a result, the defective rate may increase when producing the binding food.

Specifically, the cellulose ether, the insoluble dietary fiber, and the aqueous component may be included at a ratio of 0.3 to 2:1:14 to 22, but is not limited thereto.

The binding food of the present disclosure may further include an oily component. The oily component may be a vegetable oil, and for example, may include one or more selected from the group consisting of soybean oil, canola oil, corn oil, olive oil, sunflower oil, coconut oil, palm oil, onion oil, brown rice oil, and sesame oil, but is not limited thereto.

The oily component may be included in an amount of 15 wt % to 40 wt % based on the total weight of the binding food. Specifically, the oily component may be included in the binding food in an amount of the range consisting of any one lower limit selected from 15 wt %, 15.5 wt %, 16 wt %, 16.5 wt %, 17 wt %, 17.5 wt %, 18 wt %, 18.5 wt %, 19 wt %, 19.5 wt %, and 20 wt %, and/or any one upper limit selected from 35 wt %, 34.5 wt %, 34 wt %, 33.5 wt %, 33 wt %, 32.5 wt %, 32 wt %, 31.5 wt %, 31 wt %, 30.5 wt %, 30 wt %, 29.5 wt %, 29 wt %, 28.5 wt %, 28 wt %, 27.5 wt %, 27 wt %, 26.5 wt %, 26 wt %, 25.5 wt %, 25 wt %, 24.5 wt %, 24 wt %, 23.5 wt %, and 23 wt %.

In one specific embodiment, the binding food of the present disclosure may include the cellulose ether, the dietary fiber, the aqueous component, and the oily component at a weight ratio of 0.3 to 2:1:14 to 22:5 to 8.

The meat substitute of the present disclosure may further include a textured vegetable protein. When blended with the textured vegetable protein, the binding property of the binding food may be more enhanced.

As used herein, the term "textured vegetable protein" refers to a protein produced from a vegetable-based protein by organizing it to have a meat-like appearance, shape, and texture. The textured vegetable protein may be prepared by removing fats from vegetable-based raw materials containing proteins, but any textured vegetable protein prepared by any method may be applied without limitation. The textured vegetable protein is not limited as long as it is a protein derived from vegetable-based raw materials, and it may be specifically a protein of soybean, wheat, cottonseed, almond, mushroom, potato, pumpkin, pea, rice, corn, peanut, sunflower, etc. The textured vegetable protein may be, for example, a textured soybean protein (TSP) obtained from soybeans.

The textured vegetable protein may be included in an amount of 5 wt % to 20 wt %, based on the total weight of the binding food. Specifically, the textured vegetable protein may be included in the binding food in an amount of the range consisting of any one lower limit selected from 3 wt %, 3.5 wt %, 4 wt %, 4.5 wt %, 5 wt %, 5.5 wt % and 6 wt %, and/or any one upper limit selected from 15 wt %, 14.5 wt %, 14 wt %, 13.5 wt %, 13 wt %, 12.5 wt %, 12 wt %, 11.5 wt %, 11 wt %, 10.5 wt %, 10 wt %, 9.5 wt %, 9 wt %, 9.5 wt %, 9 wt %, 8.5 wt %, 8 wt %, 7.5 wt %, and 7 wt %, for example, in an amount of 3 wt % to 20 wt %, 4 wt % to 8 wt %, and 5 wt % to 7 wt %. When the textured vegetable protein is included in an amount of the above range, it is easy to achieve binding property and adhesiveness, and it is possible to exhibit physical properties more similar to those prepared by including an animal-based material in the binding food of the present disclosure.

Specifically, a blending ratio of the cellulose ether, the dietary fiber, and the textured vegetable protein may be in the range of 0.3 to 2:1:1 to 3, but is not limited thereto.

Specifically, the binding food of the present disclosure may further include additional ingredients such as emulsifiers, flavoring agents, natural carbohydrates, sweeteners, coloring agents, nutrients, vitamins, minerals (electrolytes), flavoring agents such as synthetic flavoring agents and natural flavoring agents, coloring agents and enhancing agents, pectic acid and salts thereof, alginic acid and salts thereof, organic acids, protective colloidal thickeners, pH adjusters, stabilizers, preservatives, glycerin, alcohol, or a combination thereof, etc. The emulsifier may be, for example, lecithin, glycerin fatty acid ester, tocopherol, or a combination thereof, but is not limited thereto. The natural carbohydrates may include monosaccharides, e.g., glucose, fructose, etc.; disaccharides, e.g., maltose, sucrose, etc.; and polysaccharides, e.g., common sugars such as dextrin, cyclodextrin, etc., and sugar alcohols such as xylitol, sorbitol, erythritol, etc. The flavoring agent may include natural flavoring agents (thaumatin, stevia extract (e.g., rebaudioside A, glycyrrhizin, etc.)) and synthetic flavoring agents (saccharin, aspartame, etc.).

Specifically, the binding food of the present disclosure may be in the form of a curd, but is not limited thereto, and it may have various forms depending on the type and characteristics of food materials or foods prepared using the binding food.

Specifically, the binding food of the present disclosure may be used, for example, for the production of patties, sausages, meatballs, and dumpling, but may be used without limitation as long as it is a proteinaceous vegetarian food. Specifically, the binding food of the present disclosure may be for the production of dumpling stuffing, but is not limited thereto.

Another aspect of the present disclosure provides a composition for producing a meat substitute, the composition including cellulose ether and insoluble dietary fiber. Specifically, the composition for producing a meat substitute may further include one or more selected from the group consisting of an aqueous component, an oily component, and a textured vegetable protein.

Definition, type, and content of the cellulose ether, insoluble dietary fiber, aqueous component, oily component, textured vegetable protein, and additional components are the same as described above.

Still another aspect of the present disclosure provides a method of preparing the binding food, the method including the step of mixing the composition including cellulose ether and insoluble dietary fiber.

The preparation method may further include the step of mixing the binding food with the textured vegetable protein.

Specifically, the step of mixing with the textured vegetable protein may be to add and mix the textured vegetable protein sequentially after performing mixing of the composition including the cellulose ether and insoluble dietary fiber, in the step of preparing the curd, but is not limited thereto.

Specifically, the step of mixing with the textured vegetable protein is to mix the cellulose ether, the dietary fiber, and the textured vegetable protein at the same time by including the textured vegetable protein together in the composition including the cellulose ether and the dietary fiber, in the step of preparing the curd, but is not limited thereto. As described, when the textured vegetable protein is sequentially blended after mixing the composition including the cellulose ether and the dietary fiber by high-speed rotation, a unique mouthfeel is achieved in the binding food during the production of the binding product, and thus chewiness may be remarkably improved.

Specifically, the composition may further include any one or more of an aqueous component and an oily component. Specifically, the composition may further include additional ingredients such as emulsifiers, flavoring agents, natural carbohydrates, sweeteners, coloring agents, nutrients, vitamins, minerals (electrolytes), flavoring agents such as synthetic flavoring agents and natural flavoring agents, coloring agents and enhancing agents, pectic acid and salts thereof, alginic acid and salts thereof, organic acids, protective colloidal thickeners, pH adjusters, stabilizers, preservatives, glycerin, alcohols, or a combination thereof, etc.

In this regard, the cellulose ether, dietary fiber, textured vegetable protein, aqueous component, and oily component, and contents, effects, characteristics thereof are the same as described above.

The mixing may be performed in a common manner in the art without limitation. Specifically, the mixing may be performed through a high-speed rotation method. The high-speed rotation may be mixing at 2,000 rpm to 4,000 rpm using a blender. When the mixing is performed at a lower speed than the above, it is not easy to produce the binding product, and it may not be suitable for forming a meat-like texture. Specifically, the high-speed rotation may be performed at a rate of 2.500 rpm to 4,000 rpm. 3,000 rpm to 4,000 rpm, 3.500 rpm to 4,000 rpm. 2,000 rpm to 3,500 rpm, 2,300 rpm to 3.600 rpm, 2.500 rpm to 3,500 rpm, 3,000 rpm to 3,500 rpm, 2,000 rpm to 3,000 rpm, 2,500 rpm to 3,000 rpm, or 3,300 rpm to 3,800 rpm. More specifically, the high-speed rotation may be performed at a rate of the range consisting of any one lower limit selected from 2,000 rpm, 2,200 rpm, 2,400 rpm, 2,600 rpm, 2,800 rpm, 3,000 rpm, 3,200 rpm and 3,400 rpm, and/or any one upper limit, which is selected to be higher than the lower limit from 2,800 rpm, 3,000 rpm, 3,200 rpm, 3,400 rpm, 3,600 rpm, 3,800 rpm, and 4,000 rpm.

Further, the mixing may be performed for 30 seconds to 2 minutes, but is not limited thereto. Specifically, the mixing may include adding water at 10° C. or lower.

The method of preparing the binding food of the present disclosure may provide a binding food capable of providing the meat-like mouthfeel and physical properties without including meats.

Still another aspect of the present disclosure provides a dumpling stuffing including the binding food. Specifically, the dumpling stuffing may further include one or more selected from the group consisting of vegetables, glass noodles, tofu, and kimchi. Specifically, the dumpling stuffing may further include at least one selected from the group consisting of vegetables, glass noodles, tofu, and kimchi, but is not limited thereto. Depending on the type, purpose, and preference of the dumpling to be prepared, any food material that may be included in the dumpling may be further included. For example, the dumpling stuffing may further include vegetables such as green onion, leek, onion, cabbage, radish, etc., glass noodles, tofu, kimchi, garlic, salt, sugar, pepper, sesame oil, sesame, etc.

Specifically, the vegetable may have an average particle size of 3 mm to 15 mm. Specifically, the average particle size of the vegetable may be 3 mm to 15 mm, but is not limited thereto. More specifically, among the vegetables, the average size of green onion may be 3 mm to 6 mm, the average size of leek may be 10 mm to 15 mm, the average size of onion may be 5 mm to 12 mm, and the average size of cabbage may be 6 mm to 10 mm, but is not limited thereto.

The dumpling stuffing may not include animal-based ingredients. The dumpling stuffing may not include lean meats, muscles, fats, or mixtures thereof, which are separated from pigs, cattle, horses, sheep, goats, deer, poultry (chicken, ducks, geese, turkey, ostriches, turkey, pheasant), etc.

The binding food is the same as described above. In this regard, when the meat substitute of the present disclosure is applied to a product prepared by mixing various raw materials such as vegetables and seasoning raw materials as in the dumpling stuffing, it exhibits excellent clumping of various raw materials and excellent chewiness after steaming, thereby exhibiting improved binding property. In particular, the meat substitute of the present disclosure has excellent binding ability, and thus even though ingredients without binding property, other than the binding food, are mainly included, specifically, even though 65 wt % or more of ingredients without binding ability are used, sufficient binding ability may be secured.

Although the dumpling stuffing of the present disclosure does not include animal-based ingredients or meats, it can retain physical properties equal or similar to those of dumpling stuffing including meats. Specifically, the dumpling stuffing may exhibit adhesiveness equal or similar to that of a binding product produced using meats. Further, the dumpling stuffing may exhibit binding property equal or similar to that of a dumpling stuffing prepared using meats, thereby realizing the mouthfeel similar thereto. Furthermore, the dumpling stuffing may include the meat substitute of the present disclosure, thereby exhibiting excellent hardness, cohesiveness, springiness, gumminess, and chewiness. Specifically, hardness, cohesiveness, springiness, gumminess, and chewiness of the dumpling stuffing may be equal or similar to hardness, cohesiveness, springiness, gumminess, and chewiness of a dumpling stuffing produced using animal-based ingredients. Therefore, the dumpling stuffing of the present disclosure may exhibit appearance, shape, texture, and mouthfeel similar to those of a dumpling stuffing produced using meats, even though animal-based ingredients are not used.

As used herein, the term "hardness" may refer to a mechanical property of food relating to flexibility. Specifically, the hardness of the dumpling stuffing may be 10 g to 20 g. For example, the hardness of the dumpling stuffing may be a rational number between the upper limit and the lower limit, when the larger number between the two numbers selected from 10 g, 10.5 g, 11 g, 11.5 g, 12 g, 12.5 g, 13 g, 13.5 g, 14 g, 14.5 g, 15 g, 15.5 g, 16 g, 16.5 g, 17 g, 17.5 g, 18 g. 18.5 g, 19 g, 19.5 g, and 20 g is set as the upper limit, and the smaller number therebetween is set as the lower limit.

As used herein, the term "cohesiveness (cohesion)" may refer to an internal binding force, a restoring force to deformation, which is required to maintain the shape of a food. Specifically, the cohesiveness of the dumpling stuffing may be 0.2 to 0.3. For example, the cohesiveness of the dumpling stuffing may be a rational number between the upper limit and the lower limit, when the larger number between the two numbers selected from 0.20, 0.21, 0.22, 0.23, 0.24, 0.25, 0.26, 0.27, 0.28, and 0.29 is set as the upper limit, and the smaller number therebetween is set as the lower limit.

As used herein, the term "springiness" may refer to a property indicating the degree to which an object quickly returns to its original shape when a force is removed after bending, pressing, or pulling the object. Specifically, the springiness of the dumpling stuffing may be 30% to 60%. For example, the springiness of the dumpling stuffing may be a rational number between the upper limit and the lower limit, when the larger number between the two numbers selected from 30%, 31%, 32%, 33%, 34%, 35%, 36%, 37%, 38%, 39%, 40%. 41%, 42%, 43%, 44%, 45%, 46%, 47%, 48%, 49%, 50%, 51%, 52%, 53%, 54%, 55%, 56%, 57%, 58%, 59%, and 60% is set as the upper limit, and the smaller number therebetween is set as the lower limit.

As used herein, the term "gumminess" may refer to a strength required to chew a semi-solid food until it is ready for swallowing or a glutinous degree. Specifically, the gumminess of the dumpling stuffing may be 3 g to 6 g. For example, the gumminess of the dumpling stuffing may be a rational number between the upper limit and the lower limit, when the larger number between the two numbers selected from 3 g, 3.1 g, 3.2 g, 3.3 g, 3.4 g, 3.5 g, 3.6 g, 3.7 g, 3.8 g. 3.9 g, 4.0 g, 4.1 g, 4.2 g, 4.3 g, 4.4 g, 4.5 g, 4.6 g, 4.7 g, 4.8 g, 4.9 g, 5.0 g, 5.1 g, 5.2 g, 5.3 g, 5.4 g, 5.5 g, 5.6 g, 5.7 g, 5.8 g, 5.9 g, and 6.0 g is set as the upper limit, and the smaller number therebetween is set as the lower limit.

As used herein, the term "chewiness" may refer to a measure of the degree to which a food must be chewed in the mouth or the amount of effort required to chew the food. The chewiness may refer to a value obtained by multiplying hardness, cohesiveness, and springiness in a texture analysis curve, when measured with a texture analyzer. Specifically, the chewiness of the dumpling stuffing may be 1 to 3. For example, the chewiness of the dumpling stuffing may be a rational number between the upper limit and the lower limit, when the larger number between the two numbers selected from 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0 is set as the upper limit, and the smaller number therebetween is set as the lower limit.

The hardness, cohesiveness, springiness, gumminess, and chewiness may be measured by using the texture analyzer or may be values calculated from the measured values.

The dumpling stuffing of the present disclosure may retain adhesiveness, hardness, cohesiveness, springiness, gumminess, or chewiness in the above range, thereby exhibiting meat-like appearance, shape, texture, binding property, and mouthfeel, and the value range may be equal or similar to physical properties of a binding product produced using an animal-based ingredient (e.g., pork meat and pork fat), as measured under the same conditions.

Still another aspect of the present disclosure provides a dumpling, which includes a dumpling skin and the dumpling stuffing including the binding food.

The binding food and the dumpling stuffing including the binding food are the same as described above.

The dumpling skin serves to form the shape of dumpling by surrounding the dumpling stuffing, and any dumpling skin may be applied without limitation as long as it is dumpling skin commonly used in the art, regardless of its material and a method of producing the dumpling skin. Specifically, the dumpling skin may be prepared by kneading grain flour. The grain flour may be wheat flour or buckwheat flour, but is not limited thereto. The dumpling skin may be prepared by adding water to the grain flour, followed by mixing and stirring, and then kneading the mixture by further adding starch, gluten, salt, edible oil, etc. The dumpling skin may be prepared by pressing the dough of grain flour and then spreading it thinly or cutting it into an appropriate size.

The dumpling of the present disclosure may exhibit a meat dumpling-like taste and mouthfeel, even though it is a dumpling including no animal-based ingredients, i.e., no meats.

The dumpling of the present disclosure may provide meat-like mouthfeel and physical properties, thereby meeting preferences of consumers while providing the consumers with improved nutrition by including significantly fewer harmful ingredients.

The dumpling may include saturated fats in an amount of 1.5 wt % or less. Specifically, the content of the saturated fats may be 1.5 wt % or less, 1.2 wt % or less, 1 wt % or less, 0.9 wt % or less, 0.1 wt % to 1.5 wt %, 0.2 wt % to 1.4 wt %, 0.5 wt % to 1.2 wt %, 0.7 wt % to 1 wt %, or 0.8 wt % to 1 wt %. As the dumpling of the present disclosure has the low content of saturated fats in the above range, there is an advantage of providing improved nutrition because the dumpling includes a smaller amount of saturated fats than a dumpling prepared using meats.

The dumpling may include cholesterol in an amount of 3.5 wt % or less Specifically, the content of cholesterol may be 3.5 wt % or less, 3 wt % or less, 2.5 wt % or less, 2 wt % or less, 1.5 wt % or less, 1 wt % or less, 0.5 wt % or less, 0.2 wt % or less. 0.1 wt % or less, 0.01 wt % or less, 0.01 wt % to 3.5 wt %, 0.01 wt % to 3 wt %, 0.01 wt % to 2 wt %, 0.01 wt % to 1 wt %, 0.1 wt % to 0.5 wt %, or 0 wt %. The meaning that the content is 0 wt % may mean that cholesterol is not included at all or is included at a non-measurable level. As the dumpling of the present disclosure includes cholesterol in the low content as described above, there is an advantage of providing improved nutrition because the dumpling includes the smaller amount of cholesterol than a dumpling prepared using meats.

The dumpling may include dietary fiber in an amount of 2 wt % or more. Specifically, the content of saturated fats may be 2 wt % or more, 2.1 wt % or more, 2.2 wt % or more. 2.3 wt % or more, 2.4 wt % or more. 2.5 wt % or more, 2.6 wt % or more, 2 wt % to 3.5 wt %, 2.1 wt % to 3.2 wt %, 2.2 wt % to 3 wt %, 2.3 wt % to 2.8 wt %. 2.4 wt % to 2.8 wt %, 2.5 wt % to 2.7 wt %, or 2.6 wt % to 2.7 wt %. As the dumpling of the present disclosure has dietary fiber in an amount of the above range, there is an advantage of meeting preferences of consumers who want to consume the dumpling and providing the consumers with more improved nutrition, because the dumpling includes a larger amount of dietary fiber than a dumpling prepared using meats or isolated soy proteins.

Effect of the Invention

A binding food of the present disclosure may achieve meat-like physical properties and mouthfeel without including animal-based ingredients.

The binding food of the present disclosure has excellent adhesiveness, as measured through a physical properties analyzer, and has adhesiveness and binding property equal or similar to those of a binding product produced using actual meats. Therefore, the binding food may exhibit mouthfeel similar to that of a food material containing meats or may exhibit physical properties suitable for producing foods such as dumpling. Accordingly, the binding food of the present disclosure may be usefully applied as a material to replace meat products containing animal-based ingredients.

Dumpling stuffing and dumpling, each including the binding food of the present disclosure, may exhibit adhesiveness, hardness, cohesiveness, springiness, gumminess and chewiness similar to those of dumpling stuffing containing meats. Thus, even without animal-based ingredients, they may exhibit the mouthfeel similar to that of the existing meat dumpling, and may also reduce the contents of components harmful to the body, as compared to foods containing meats, thereby providing high-nutrition foods.

Accordingly, the binding food of the present disclosure or foods produced using the same such as dumpling may be consumed by people with limited meat consumption due to beliefs, religion, disease, constitution, etc.

Hereinafter, the present disclosure will be described in more detail with reference to Examples. However, these Examples are for illustrative purposes only, and the scope of the present disclosure is not intended to be limited by these Examples.

Example 1: Preparation of Binding Food Including Cellulose Ether and Insoluble Dietary Fiber and Having Adhesiveness A binding product having adhesiveness was prepared in the form of curd by using cellulose ether and insoluble dietary fiber.

In detail, methylcellulose (MC) or hydroxypropyl methylcellulose (HPMC) as the cellulose ether, and wheat dietary fiber (VITACEL's Wheat Fiber WF300) or bamboo dietary fiber (SANACEL's bamboo 200) as the insoluble dietary fiber were used. A textured vegetable protein (Solbar's Textured Soy Protein Concentrates), soybean oil (oily component), and water (aqueous component) were added at a blending ratio of Table 1 below to prepare a composition for preparing a adhesive food material of the present disclosure. Then, the composition was blended using a blender to prepare a binding product having adhesiveness in the form of curd.

In detail, the cellulose ether, insoluble dietary fiber, and soybean oil were blended using the blender at a high speed of 2,000 rpm or higher for 1 minute to emulsify, and water and the textured vegetable protein were also blended using the blender under the same conditions. The water used for blending was cold water at 10° C. or lower.

TABLE 1

| | | Experimental Example 1 | Experimental Example 2 | Experimental Example 3 | Experimental Example 4 | Experimental Example 5 | Experimental Example 6 |
|---|---|---|---|---|---|---|---|
| Cellulose ether | Methyl cellulose | 1.42% | 1.42% | 2.13% | — | — | — |
| | Hydroxypropyl methyl cellulose | — | — | | 2.84% | 3.56% | 4.27% |
| Insoluble dietary fiber | Wheat dietary fiber | 4.27% | — | 3.56% | — | — | — |
| | Bamboo dietary fiber | — | 4.27% | — | 2.84% | 2.13% | 1.42% |
| Textured vegetable protein (TVP) | | 6.82% | 6.82% | 6.82% | 6.82% | 6.82% | 6.82% |

TABLE 1-continued

| | Experimental Example 1 | Experimental Example 2 | Experimental Example 3 | Experimental Example 4 | Experimental Example 5 | Experimental Example 6 |
|---|---|---|---|---|---|---|
| Soybean oil | 22.51% | 22.51% | 22.51% | 22.51% | 22.51% | 22.51% |
| Water | 61.12% | 61.12% | 61.12% | 61.12% | 61.12% | 61.12% |

Example 2: Preparation of Pork Binding Product

Pork binding products of Comparative Example 1 and Comparative Example 2 were prepared using meats. In detail, 1% salt was added to pork (minced pork leg, hereinafter, referred to as pork) and blended for 5 minutes, and then pork fat (minced pork fat) was added, followed by mixing using a vertical mixer (KitchenAid 5 Quart Mixer) for 5 minutes. In Comparative Example 1, pork meat and fat (pork fat) ingredients were blended at a weight ratio of 7:3. In Comparative Example 2, pork meat and pork fat were blended at a weight ratio of 5:5.

Example 3: Preparation of Meat Substitute Using Isolated Soy Protein

A meat substitute of Comparative Example 3 was prepared by adding isolated soy protein (ISP), which is commonly used as a meat protein substitute, without adding insoluble dietary fiber. Each component was added according to the blending ratio of Table 2 below, followed by blending using a blender.

TABLE 2

| Ingredient | Comparative Example 3 (wt %) |
|---|---|
| Methyl cellulose | 2.03 |
| Gluten | 6.60 |
| Isolated Soy Protein (ISP) | 15.23 |
| Water | 55.84 |
| Vegetable oil | 12.69 |
| Modified starch | 7.61 |
| Spice, Color | 0 |

Example 4: Examination of Adhesiveness

In order to replace a binding product produced using actual meats, it is important to produce a binding product with meat-like adhesiveness even though it does not include meats. Accordingly, adhesiveness was measured for the products of Experimental Examples 1 to 6.

In detail, the products of Experimental Examples 1 to 6, the pork binding products of Comparative Examples 1 and 2, and the substitute material of Comparative Example 3 were molded into a cylinder form with a diameter of 3 cm and a height of 1.5 cm, respectively, and then, adhesiveness was measured using a physical properties analyzer. Adhesiveness may be measured as a force required to separate the surface of a food from the surface of another object when they are adhered to each other. The measurement was repeated five times under the following measurement conditions using a P/200 probe, and then the average value was derived. The statistical significance of the results was analyzed with the 95% confidence intervals using Tukey's Method with One-Way ANOVA of MINITAB. It was determined that there was a significant difference between the values that did not share letters in the data of the experimental results.

[Conditions for Adhesiveness Measurement]

Force: 5.0 g

Distance: 40 mm

Test speed: 2.00 mm/s

TABLE 3

| | Adhesiveness (g · sec) |
|---|---|
| Comparative Example 1 | $455.4^{BCDE}$ |
| Comparative Example 2 | $498.1^{BCDE}$ |
| Experimental Example 1 | $438.1^{BCD}$ |
| Experimental Example 2 | $511.37^{CDE}$ |
| Experimental Example 3 | $673.7^{DEF}$ |
| Experimental Example 4 | $600.3^{DE}$ |
| Experimental Example 5 | $519^{CDE}$ |
| Experimental Example 6 | $914.4^{F}$ |
| Comparative Example 3 | $1.55^{A}$ |

*Mean values with different superscript letters have statistically significant differences ($P<0.05$).

As a result, Comparative Example 1 with 70% pork content, which was prepared using actual pork as a raw material, showed adhesiveness of 498.1 g·sec, Comparative Example 2 with 50% pork content showed adhesiveness of 455.4 g·sec, and the binding products of Experimental Examples 1 to 5 of the present disclosure showed adhesiveness equal or similar to that of the pork binding products of Comparative Examples 1 and 2 (Table 3). Therefore, it was confirmed that the materials of Experimental Examples 1 to 5 had meat-like adhesiveness even without including meats, thereby being suitable for replacing the pork binding product. In contrast, the product of Experimental Example 6 showed adhesiveness of 914.4 g·sec, which was very high, as compared to that of the pork binding product, indicating that it had no function as a substitute material for pork meat and fat binding products. Meanwhile, the material of Comparative Example 3 showed very small adhesiveness of 1.55 g·sec, indicating that it had no binding property. Thus, it was confirmed that the material of Comparative Example 3 had no function as a substitute material for pork meat and fat binding products.

Example 5: Preparation of Dumpling Stuffing and Examination of Physical Properties of Dumpling Stuffing Dumpling stuffing was prepared using each of the binding products of Experimental Examples 1 to 6, the pork binding product of Comparative Example 1, and the material of Comparative Example 3 at the blending ratio of Table 4 below. To each dumpling stuffing, each of the binding products of Experimental Examples 1 to 6 and Comparative Examples 1 and 3 was added in an amount of 15.5 wt %, and dumpling stuffing was prepared by blending them using a vertical mixer. Vegetables used at this time were green onion of 3 mm to 5 mm, leek of 12 mm, and onion and cabbage of 8×8 mm in size.

TABLE 4

| | Content (wt %) |
|---|---|
| Flavor enhancer (seasoning, etc.) | 9.8 |
| One of Experimental Examples 1 to 6 and Comparative Examples 1, 3 | 15.5 |
| Tofu | 12.6 |
| Vegetables (green onion, leek, onion, cabbage) | 57 |
| Textured vegetable protein (TVP) | 5.1 |

Then, various physical properties of the dumpling stuffing prepared as described above were measured using a physical properties analyzer. In detail, the dumpling stuffing to which each of the binding products of Experimental Examples 1 to 6 and Comparative Examples 1 and 3 was added was molded into a cylindrical shape with a diameter of 3 cm and a height of 1.5 cm, and then steamed at 99° C. for 5 minutes. Thereafter, hardness, cohesiveness, springiness, gumminess, and chewiness were measured using a texture profile analysis-two bite test (TPA). The results are shown in Table 5 below.

TABLE 5

| | Hardness (g) | cohesiveness | Springiness (%) | Gumminess | Chewiness |
|---|---|---|---|---|---|
| Comparative Example 1 | $18.0912^{A}$ | $0.2732^{A}$ | $51.5486^{A}$ | $4.9346^{A}$ | $2.5512^{A}$ |
| Comparative Example 3 | $15.9464^{AB}$ | $0.2126^{BC}$ | $42.8066^{ABC}$ | $3.3774^{BC}$ | $1.453^{BC}$ |
| Experimental Example 1 | $17.7878^{A}$ | $0.2876^{A}$ | $49.376^{AB}$ | $5.1132^{A}$ | $2.5266^{A}$ |
| Experimental Example 2 | $17.6798^{A}$ | $0.2748^{A}$ | $48.0136^{AB}$ | $4.82^{AB}$ | $2.3166^{AB}$ |
| Experimental Example 4 | $15.681^{AB}$ | $0.202^{C}$ | $34.513^{BC}$ | $3.17525^{C}$ | $1.10875^{C}$ |
| Experimental Example 5 | $14.57688^{AB}$ | $0.2635^{AB}$ | $39.54813^{ABC}$ | $3.877^{ABC}$ | $1.6385^{ABC}$ |
| Experimental Example 6 | $13.47938^{B}$ | $0.2525^{ABC}$ | $33.88188^{C}$ | $3.418375^{C}$ | $1.183125^{C}$ |

The statistical significance of the results was analyzed with the 95% confidence intervals using Tukey's Method with One-Way ANOVA of MINITAB. It was determined that there was a significant difference between the values that did not share letters in the data of the experimental results.

As a result, the dumpling stuffing, to which Experimental Example 1 or Experimental Example 2 including methylcellulose was added, showed statistically equivalent results in all of hardness, cohesiveness springiness, gumminess and chewiness, as compared with the dumpling stuffing, to which the binding product of Comparative Example 1 including 70% pork meat was added (Table 5). Therefore, it was confirmed that the binding products of the present disclosure have adhesiveness similar to that of the pork binding product, thereby exhibiting not only binding property, but also physical properties similar to those of products using meats, when actually used in the production of foods.

Meanwhile, the dumpling stuffing using hydroxypropyl methylcellulose (Experimental Example 5 was added) showed similar hardness, but low cohesiveness, springiness, gumminess, and chewiness, as compared to those of Comparative Example 1 using meats (Table 5). These results indicate that the material using hydroxypropyl methylcellulose may be used as a substitute when the content of pork is relatively small. For example, when the ratio of pork is lower than that of the pork binding product (70% pork meat, 30% pork fat) used in Comparative Example 1, the binding product including hydroxypropyl methylcellulose of the present disclosure may be usefully applied.

In producing meat-based foods such as dumpling, the composition ratio of pork meat and fat may vary depending on complex factors such as the input ratio of various auxiliary materials such as vegetables, or the content of liquid raw materials, etc. Therefore, when the binding product of the present disclosure is used, the type of cellulose ether may be selected according to the characteristics and purpose to be achieved. Thus, when dumpling stuffing having various physical properties is produced, the binding product of the present disclosure may be used, instead of meats.

Example 6: Examination of Ingredients of Dumpling

With respect to dumplings produced using the binding products of Experimental Examples 1 to 6 and Comparative Example 1 and Comparative Example 3, the contents of nutrients therein were examined. The dumpling stuffing and dumpling were prepared in the same manner as in Example 5. According to the national standard food composition table (9th revision), the caloric value of 150 g of dumpling per serving, and the contents of proteins, lipids, carbohydrates, sugars, dietary fibers, and sodium, and the contents of cholesterol, saturated fats, and trans fats as lipid components were theoretically calculated, based on the ingredients and blending of the dumpling of Example 5, and the values thus calculated are shown in Table 6 below.

TABLE 6

| | Comparative Example 1 | Comparative Example 3 | Experimental Examples 1 to 6 |
|---|---|---|---|
| Calorie (kcal) | 275.1 | 254.25 | 259.35 |
| Protein (g) | 11.25 | 11.7 | 9.75 |
| Lipid (g) | 10.35 | 7.35 | 9 |
| Carbohydrate (g) | 33.6 | 34.8 | 34.35 |
| Sugars (g) | 1.35 | 1.35 | 1.5 |
| Dietary fiber (g) | 2.7 | 3.15 | 3.906 |
| Sodium (mg) | 1463.1 | 1318.65 | 1340.55 |
| Cholesterol (mg) | 11.55 | 0 | 0 |
| Saturated fat (g) | 2.85 | 1.2 | 1.35 |
| Trans fat (g) | 0 | 0 | 0 |

As a result, the dumplings prepared using the binding products of the present disclosure showed the lower calories, the larger amount of dietary fiber, and the remarkably smaller amount of cholesterol and saturated fat than the dumpling prepared using the material of Comparative Example 1 including meats. The dumplings were characterized by having abundant dietary fiber, as compared with the dumpling prepared from the material of Comparative Example 4 using isolated soy protein.

Accordingly, the binding foods of the present disclosure may exhibit excellent adhesiveness and meat-like physical properties even without including meats, and thus the binding foods may be used as a substitute material for meat products, making it possible to produce dumplings with the meat substitute, and also have the lower calorie, the reduced contents of cholesterol and saturated fat, and the increased content of dietary fiber. Thus, there is an advantage of providing improved nutrition for consumers who consume the same.

Based on the above description, it will be understood by those skilled in the art that the present disclosure may be implemented in a different specific form without changing the technical spirit or essential characteristics thereof. In this regard, it should be understood that the above embodiment is not limitative, but illustrative in all aspects. The scope of the disclosure is defined by the appended claims rather than by the description preceding them, and therefore all changes and modifications that fall within metes and bounds of the claims, or equivalents of such metes and bounds are therefore intended to be embraced by the claims.

What is claimed is:

1. A binding food which comprises cellulose ether, insoluble dietary fiber of 2 wt % to 7 wt %, and textured vegetable protein (TVP) of 3 wt % to 20 wt %, and has an adhesiveness of 300 g·sec to 700 g·sec.

2. The binding food of claim 1, which does not comprise animal dietary fibers, animal proteins, and animal fats.

3. The binding food of claim 2, wherein the food exhibits meat-like physical properties and mouthfeel even without including animal dietary fibers, animal proteins, and animal fats.

4. The binding food of claim 1, wherein the cellulose ether and insoluble dietary fiber are included at a ratio of 0.3 to 2:1.

5. The binding food of claim 1, wherein the cellulose ether is included in an amount of 1 wt % to 5 wt % based on the weight of the food.

6. The binding food of claim 1, wherein the cellulose ether is methylcellulose or hydroxypropyl methylcellulose.

7. The binding food of claim 1, wherein the insoluble dietary fiber is wheat dietary fiber or bamboo dietary fiber.

8. The binding food of claim 1, further comprising an aqueous component, wherein the aqueous component includes water.

9. The binding food of claim 8, wherein the water is included in an amount of 45 wt % to 65 wt % based on the weight of the food.

10. The binding food of claim 8, wherein the cellulose ether and the insoluble dietary fiber are included in an amount of 5 wt % to 10 wt % based on the weight of the food, and the aqueous component is included in an amount of 50 wt % to 70 wt % based on the weight of the food.

11. The binding food of claim 8, wherein the cellulose ether, insoluble dietary fiber, and aqueous component are included at a ratio of 0.3 to 2:1:14 to 22.

12. The binding food of claim 1, further comprising an oily component.

13. The binding food of claim 12, wherein the oily component is included in an amount of 15 wt % to 30 wt % based on the total weight of the food.

14. The binding food of claim 12, wherein the oily component comprises one or more selected from the group consisting of soybean oil, canola oil, corn oil, olive oil, sunflower oil, coconut oil, palm oil, onion oil, brown rice oil, and sesame oil.

15. The binding food of claim 12, wherein the cellulose ether, the insoluble dietary fiber, the aqueous component, and the oily component are included at a ratio of 0.3 to 2:1:14 to 22:5 to 8.

16. A method of preparing the binding food of claim 1, comprising mixing a composition including cellulose ether and insoluble dietary fiber at a rate of 2,000 rpm to 4,000 rpm.

17. The method of claim 16, further comprising mixing with a textured vegetable protein.

18. A dumpling stuffing comprising the binding food of claim 1.

19. The dumpling stuffing of claim 18, further comprising one or more selected from the group consisting of vegetables, glass noodles, tofu, and kimchi.

20. The dumpling stuffing of claim 18, wherein the dumpling stuffing exhibits meat-like physical properties and mouthfeel even without including meats.

21. The dumpling stuffing of claim 18, which exhibits one or more of the following characteristics:

a) a hardness of 13 g to 20 g;

b) a springiness of 30% to 60%;

c) an cohesiveness of 0.2 to 0.3;

d) a gumminess of 3 g to 6 g; and e) a chewiness of 1 to 3.

22. A dumpling comprising a dumpling skin; and the dumpling stuffing of claim 18.

23. The dumpling of claim 22, wherein the dumpling comprises less than 2 wt % of saturated fats, 3.5 wt % or less of cholesterol, or 2 wt % or more of dietary fiber.

* * * * *